(12) United States Patent
Bonne

(10) Patent No.: US 9,156,446 B2
(45) Date of Patent: Oct. 13, 2015

(54) METHOD AND DEVICE FOR ACTIVATING AT LEAST ONE VEHICLE COMPONENT OF A VEHICLE

(75) Inventor: Uwe Bonne, Büttelborn (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 752 days.

(21) Appl. No.: 12/835,173

(22) Filed: Jul. 13, 2010

(65) Prior Publication Data

US 2011/0040454 A1 Feb. 17, 2011

(30) Foreign Application Priority Data

Jul. 15, 2009 (DE) .......................... 10 2009 033 097

(51) Int. Cl.
| B60R 22/00 | (2006.01) |
| E05F 15/00 | (2015.01) |
| G05D 1/00 | (2006.01) |
| G05D 3/00 | (2006.01) |
| G06F 7/00 | (2006.01) |
| G06F 17/00 | (2006.01) |
| G06F 17/10 | (2006.01) |
| G06G 7/78 | (2006.01) |
| G08G 1/16 | (2006.01) |
| B60T 7/12 | (2006.01) |
| B60T 8/174 | (2006.01) |

(52) U.S. Cl.
CPC . B60T 7/12 (2013.01); B60T 8/174 (2013.01); B60T 2260/04 (2013.01)

(58) Field of Classification Search
CPC ........ B60T 7/12; B60T 8/174; B60T 2260/04

USPC ............................................................. 701/48
See application file for complete search history.

(56) References Cited

U.S. PATENT DOCUMENTS 6,023,227 A * 2/2000 Yanko et al. ................... 340/576
6,504,259 B1 * 1/2003 Kuroda et al. ............... 290/40 C
6,994,407 B2 * 2/2006 Kinder et al. ................. 303/191

(Continued)

FOREIGN PATENT DOCUMENTS

DE 19624116 C1 8/1997
DE 19803345 A1 8/1999

(Continued)

OTHER PUBLICATIONS

British Patent Office, British Search Report for British Application No. 1011509.5, Oct. 29, 2010.

(Continued)

*Primary Examiner* — Yonel Beaulieu
*Assistant Examiner* — Lail Kleinman
(74) *Attorney, Agent, or Firm* — Ingrassia Fisher & Lorenz PC

(57) ABSTRACT

A method is provided for activating at least one vehicle component of a vehicle in a braking situation of the vehicle. The method includes, but is not limited to raking of the vehicle to a halt and monitoring of at least one second vehicle component take place, and the second vehicle component can be actuated by a vehicle occupant. In addition, actuation of the at least one first vehicle component after a predetermined time takes place in the event that the second vehicle component is not actuated by the vehicle occupant within the predetermined time.

15 Claims, 1 Drawing Sheet

(56) References Cited

U.S. PATENT DOCUMENTS

| | | | |
|---|---|---|---|
| 7,031,818 | B2 | 4/2006 | Endres |
| 7,099,766 | B2 | 8/2006 | Michi et al. |
| 2003/0214185 | A1* | 11/2003 | Kinder et al. ............... 303/192 |
| 2004/0017106 | A1* | 1/2004 | Aizawa et al. ............... 303/191 |
| 2004/0145496 | A1* | 7/2004 | Ellis ............................. 340/905 |
| 2005/0010352 | A1* | 1/2005 | Michi et al. .................... 701/96 |
| 2006/0076204 | A1* | 4/2006 | Kinder ........................... 192/15 |
| 2006/0163943 | A1* | 7/2006 | Von Holt et al. ............. 303/177 |
| 2006/0232439 | A1* | 10/2006 | Reumermann ............... 340/905 |
| 2007/0203616 | A1* | 8/2007 | Borrmann et al. .............. 701/1 |
| 2008/0091309 | A1* | 4/2008 | Walker ............................. 701/1 |
| 2008/0250861 | A1* | 10/2008 | Truesdale et al. .............. 73/702 |
| 2009/0198408 | A1* | 8/2009 | Salman et al. .................. 701/34 |
| 2010/0066562 | A1 | 3/2010 | Staehlin et al. |
| 2010/0217488 | A1* | 8/2010 | Nijakowski et al. ........... 701/48 |
| 2010/0318256 | A1* | 12/2010 | Breuer et al. ................... 701/29 |
| 2012/0123644 | A1* | 5/2012 | Waldmann ...................... 701/45 |

FOREIGN PATENT DOCUMENTS

| | | |
|---|---|---|
| DE | 10036273 A1 | 2/2002 |
| DE | 10058071 A1 | 6/2002 |
| DE | 10152632 A1 | 5/2003 |
| DE | 10220566 A1 | 11/2003 |
| DE | 10255332 A1 | 7/2004 |
| DE | 10320722 A1 | 11/2004 |
| DE | 102005018422 A1 | 2/2006 |
| DE | 102006005021 A1 | 8/2007 |
| DE | 102007021242 A1 | 1/2008 |
| DE | 102007052540 A1 | 7/2008 |
| JP | 62210161 A | 9/1987 |
| JP | 11316898 A | 11/1999 |
| JP | 2006298133 A * | 11/2006 |
| WO | 2008083556 A1 | 7/2008 |

OTHER PUBLICATIONS

German Patent Office, German Search Report for German Application No. 102009033097.6, Oct. 12, 2009.

* cited by examiner

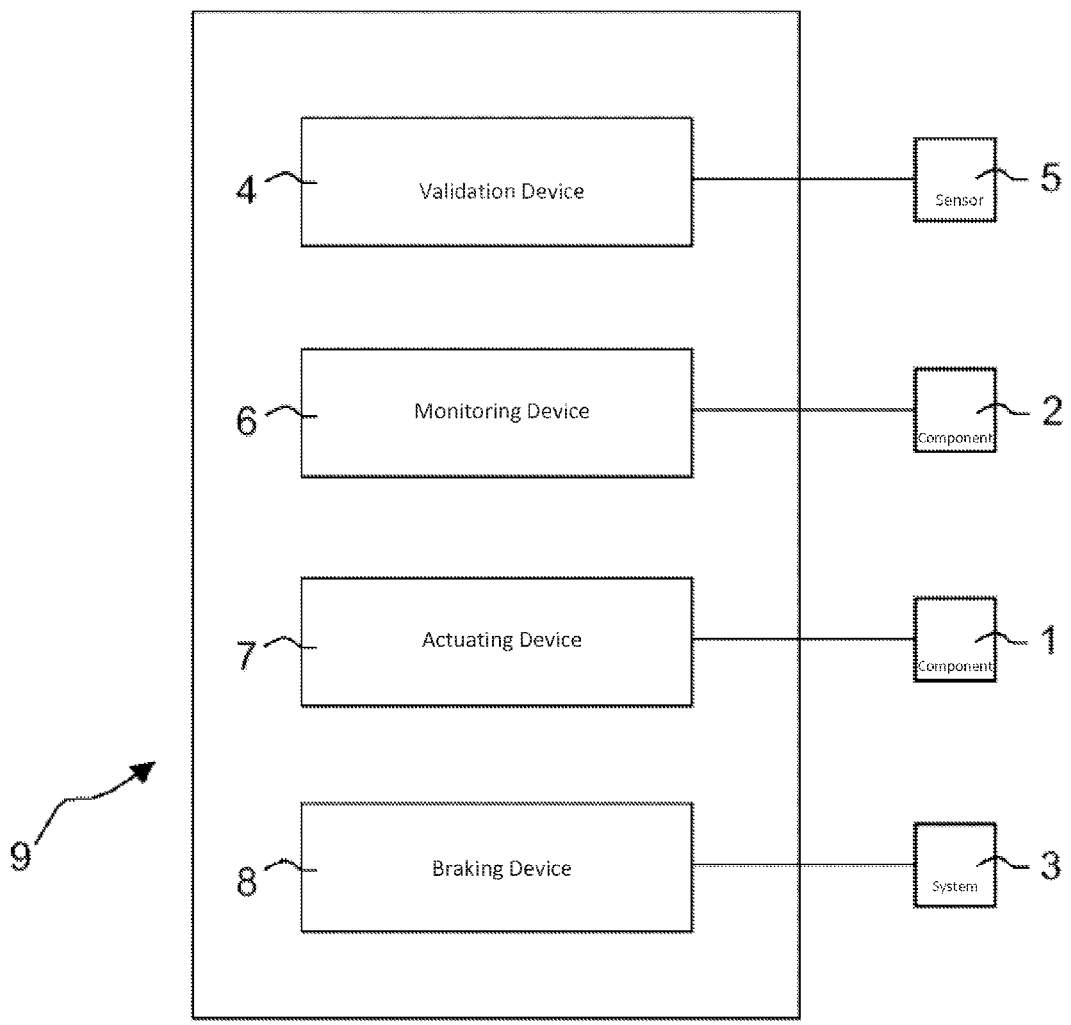

METHOD AND DEVICE FOR ACTIVATING AT LEAST ONE VEHICLE COMPONENT OF A VEHICLE

CROSS-REFERENCE TO RELATED APPLICATION

This application claims priority to German Patent Application No. 102009033097.6, filed Jul. 15, 2009, which is incorporated herein by reference in its entirety.

TECHNICAL FIELD

The invention relates to a method and a device for activating at least one first vehicle component of a vehicle in a braking situation of the vehicle.

BACKGROUND

From DE 10 2007 052 540 A1, a method for the location dependent warning of vehicles of danger situations is known, and the respective vehicles involved in the method comprise means for exchanging information, means for outputting warning signals and means for determining own location coordinates. Here, the means for outputting warning signals are activated with a first vehicle and via the means for exchanging information and as first information the position of the first vehicle and as second information the activated warning signal are transmitted to the surrounding vehicles. In at least one further vehicle the information is received via the means for exchanging information and the first information compared with further information about the position of the further vehicle and evaluated and in the event of a danger situation to the further vehicle, corresponding measures for minimizing the danger situation in the further vehicle initiated.

In view of the foregoing, at least object of the invention is to state a method and a device for activating at least one first vehicle component of a vehicle in a braking situation of the vehicle. Furthermore, other objects, desirable features, and characteristics will become apparent from the subsequent summary and detailed description, and the appended claims, taken in conjunction with the accompanying drawings and this background.

SUMMARY

This at least one object, other objects, desirable features, and characteristics are solved with a method for activating at least one first vehicle component of a vehicle and a device for activating at least one first vehicle component of a vehicle.

According to an embodiment of the invention, a method for activating at least one first vehicle component of a vehicle is provided in a braking situation of the vehicle, having the following steps. The vehicle is braked to a halt and monitoring of at least one second vehicle component takes place, and the second vehicle component can be actuated by a vehicle occupant. In addition, actuation of the at least one first vehicle component following a predetermined time takes place in the event that the second vehicle component is not actuated by the vehicle occupant within the predetermined time. Actuation of the at least one first vehicle component in this case is suitable to leave the vehicle in the stationary state. To this end, the at least one first vehicle component is designed to make possible and/or bring about remaining of the vehicle in the stationary state.

In that the second vehicle component may be actuated by the vehicle occupant is monitored and the first vehicle component is actuated after a predetermined time in the event that the second vehicle component is not actuated by the vehicle occupant within the predetermined time the method has the advantage that the vehicle following the actuation of the first vehicle component continues to remain in the stationary state.

Thus, safe parking of the vehicle following its having been braked to a halt is guaranteed and uncontrolled rolling away of the vehicle avoided. Thus, the vehicle is parked safely even if the driver or further vehicle occupants are no longer able to safely park it by themselves. This is an advantage particularly if the driver of the vehicle or further vehicle occupants are unconscious as can be the case after severe emergency braking. It is also conceivable that the driver or further vehicle occupants during emergency braking have suffered injuries, as a result of which they are no longer able to safely park the vehicle by their own efforts. Because of this, a danger situation for the occupants of the vehicle is further minimized.

In a preferred configuration of the method, braking of the vehicle takes place at least partially through a system of the vehicle. In a further preferred configuration braking of the vehicle takes place completely through a system of the vehicle. Partial or complete braking of the vehicle through a system of the vehicle is advantageous particularly in emergency brake applications, since with these there is the possibility that the sole braking of the vehicle to a halt by the driver of the vehicle does not take place or not in time. Complete braking of the vehicle by a vehicle's own system additionally has the advantage that in conjunction with the further steps of the method according to the invention further danger situations are avoided or minimized, for example in the event that the driver of the vehicle has fallen asleep.

The system of the vehicle in this case can be a safety system and/or a driver assistance system. The braking of the vehicle through a safety system and/or a driver assistance system advantageously makes possible a shortened braking duration or a reduced braking distance.

In an embodiment of the method according to the invention, the second vehicle component is a braking device or an accelerating device. Providing a braking device for the second vehicle component advantageously allows a vehicle occupant to safely park the vehicle by himself if said occupant having braked the vehicle to a halt is himself still capable of doing so. If the second vehicle component is an accelerating device this advantageously makes possible that the vehicle can be again accelerated from the stationary state if this is desired by the vehicle occupants, particularly the driver, after the braking of the vehicle.

In a further embodiment the first vehicle component is a braking device and/or a driving device and/or a transmission device. The braking device can be an electric parking brake and the driving device an engine of the vehicle. Actuating the first vehicle component can more preferably be shutting down the engine if the first vehicle component is a driving device. In addition, actuating the first vehicle component can be the engaging of a gear or a transmission position which corresponds to a parking position of the vehicle, if the first vehicle component is a transmission device and the vehicle has an automatic transmission.

The system of the vehicle can remain activated within the predetermined time. This advantageously allows the vehicle to safely remain in the stationary state within the predetermined time.

In an advantageous embodiment of the method according to the invention, monitoring of the second vehicle component takes place by an on-board computer of the vehicle. This has the advantage that already existing vehicle components can be employed for the method according to an embodiment of the invention.

In a further configuration the vehicle comprises a validation device with at least one sensor, and the validation device prevents the actuation of the at least one first vehicle component after the predetermined time in the event that the validation device rates actuation unreasonable. Advantageously this makes possible further reduction of the danger potential in the braking situation of the vehicle, since because of this actuation of the first vehicle component in situations, in which such would be disadvantageous, is avoided.

The at least one sensor can be an acoustic and/or optical sensor. More preferably, the sensor can be a field-of-vision sensor for sensing the driver's field of vision. In addition, the validation device can comprise a fuzzy logic and/or a neural network.

In a further advantageous embodiment of the method according to the invention, a hazard-warning light and/or vehicle lighting and/or warning information is/are activated after/or during the braking of the vehicle to a halt. Advantageously this makes possible warning other road users of a possible danger situation. The warning information in this case can be transmitted via a vehicle-to-vehicle communication device and/or a vehicle-to-infrastructure communication device. In a particularly preferred embodiment the vehicle is a motor vehicle.

The embodiments of the invention furthermore relate to a device for activating at least one first vehicle component of a vehicle in a braking situation of the vehicle, and the device comprises a braking device, which is designed for braking the vehicle to a halt. In addition, the device comprises a monitoring system which is designed for monitoring at least one second vehicle component. The second vehicle component in this case can be actuated by a vehicle occupant. In addition, the device comprises an actuation device, and the actuation device is designed for actuating the at least one first vehicle component after a predetermined time, if within the predetermined time the second vehicle component is not actuated by the vehicle occupant.

The device according to an embodiment of the invention makes possible simple and reliable implementation of the method according an embodiment of the invention.

In a configuration of the device according to the invention the second vehicle component is a braking device or an accelerating device and the first vehicle component a braking device and/or a driving device and/or a transmission device.

The device can additionally comprise a validation device with at least one sensor, and the validation device is designed to prevent actuation of the at least one first vehicle component after the predetermined time, in the event that the validation device rates the actuation unreasonable. The sensor can be an acoustic and/or optical sensor. More preferably, the sensor can be a field-of-vision sensor for sensing the field of vision of the driver. The validation device can comprise a fuzzy logic and/or a neural network.

In a particularly preferred embodiment the vehicle is a motor vehicle.

BRIEF DESCRIPTION OF THE DRAWINGS

The present invention will hereinafter be described in conjunction with the following drawing FIGURE that shows a device for activating at least one first vehicle component 1 of a vehicle.

DETAILED DESCRIPTION

The following detailed description is merely exemplary in nature and is not intended to limit application and uses. Furthermore, there is no intention to be bound by any theory presented in the preceding background or summary or the following detailed description.

Here, FIG. 1 shows a device 9 for activating at least one first vehicle component 1 of a vehicle which is not shown in more detail in a braking situation of the vehicle according to an embodiment of the invention.

Here, the device 9 comprises a braking device 8 which is designed for braking the vehicle to a halt. Here, the braking device 8 can for example be a brake of the vehicle. In the shown embodiment the braking device 8 is connected with a system 3 of the vehicle, which is designed for controlling the braking device 8 and thus makes possible partial or complete braking of the vehicle to a halt by the system 3. The system 3 for example is a safety system and/or a driver assistance system. As safety system, all braking systems with electronic control available in the vehicle can be employed. Here, the safety system can for example be a so-called electronic brake system (EBS), an engine management system (EMS), an anti-lock braking system (ABS), an electronic stability program (ESP), a drive-slip control (ASR), an electronic differential lock (EDS), a transmission control unit (TCU), electronic brake force distribution (EBV) and/or an engine drag moment control (MSR).

The driver assistance system can for example be a convenience system, a brake assistant, a cruise control, a distance control cruise control (adaptive cruise control, ACC) a lane holding assistant or lane assistant, a lane changing assistant, intelligent speed adaptation (ISA), a full speed range adaptive cruise control (FSRACC) or a system for automatic emergency braking (AMB).

The device 9 additionally comprises a monitoring device 6, which is designed for monitoring at least one second vehicle component 2, can be actuated by a vehicle occupant and can be a braking device or an accelerating device of the vehicle. The monitoring device 6 for example is part of an on-board computer of the vehicle.

In addition, the device 9 comprises an actuating device 7 which is designed for actuating at least the first vehicle component 1 after a predetermined time. Actuation of the first vehicle component 1 takes place if within the predetermined time the second vehicle component 2 is not actuated by the vehicle occupant. The first vehicle component 1 can be a braking device and/or a driving device and/or a transmission device of the vehicle. More preferably, the first vehicle component 1 can be an electric parking brake or an engine of the vehicle.

In the shown embodiment the vehicle is a motor vehicle, for example a passenger car or a commercial vehicle.

The device 9 makes possible implementing the method for activating the first vehicle component 1 of the vehicle in a braking situation of the vehicle according to an embodiment of the invention. Here, the method comprises the following steps. Initially, the vehicle is braked to a halt by means of the braking device 8. Here, braking can partially or completely take place through the system 3 of the vehicle. In addition, monitoring of the second vehicle component 2 by the monitoring device 6 takes place. If within the predetermined time the second vehicle component 2 is not actuated by the vehicle occupant, actuation of the first vehicle component 1 through the actuating device takes place after the predetermined time.

Thus, the device 9 and the method for activating the first vehicle component 1 make possible safe parking of the vehicle following braking of the vehicle to a halt, for example following an emergency brake application of the vehicle and thus contribute to increasing the road safety and improved protection of the vehicle occupants.

The device 9 additionally comprises a validation device 4. The validation device 4 is connected with a sensor 5. The sensor 5 can for example be an acoustic sensor, an optical sensor, a rain sensor, a light sensor, a temperature sensor, a sensor for position sensing of the vehicle, a distance sensor for determining a distance to additional vehicles or objects in the vicinity of the vehicle, a speed sensor, a rotational speed sensor and/or a field-of-vision sensor for sensing the field of vision of the driver.

The validation device 4 can comprise a fuzzy logic and/or a neural network. The validation device 4 checks by means of the measurement data sensed by the sensor 5 if actuation of the first vehicle component 1 after the predetermined time is reasonable. In the event that the validation device 4 rates actuation of the first vehicle component 1 unreasonable, the validation device 4 prevents actuation.

In the shown embodiment the system 3 remains activated within the predetermined time. For example, the brake pressure can be continued to be maintained via an electronic stability program (ESP), as a result of which the vehicle is secured against unintentional rolling away within the predetermined time.

In addition, it can be provided to activate a hazard-warning light and/or vehicle lighting and/or warning information after or even during braking of the vehicle to a halt. Here, the warning information can be transmitted via a vehicle-to-vehicle communication device and/or a vehicle-to-infrastructure communication device. By this, other road users can be warned of a possible danger situation.

A particularly preferred exemplary embodiment of the method according to the invention makes possible that the vehicle is secured against unintentional rolling away following an emergency brake application, i.e. the brake pressure is initially continued to be maintained via the ESP system. If, following the predetermined time, the vehicle has not been "taken over" again by the driver, i.e., the driver for example actuates the brake independently or he steps on the accelerator pedal, the electric parking brake, if available, is activated and the engine shut off. In the case of vehicles with automatic transmission engaging of a gear or the transmission position "P" can be additionally activated as safeguard against rolling away.

A further particularly advantageous embodiment of the invention is also wherein safety functions described above are activated if the vehicle is braked to a halt through a convenience system such as FSRACC and following this no driver operation is detected after an extended time. Here, it would also be conceivable that the driver for example has become unconscious or fallen asleep.

While at least one exemplary embodiment has been presented in the foregoing summary or detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for activating a parking brake of a vehicle, the method comprising:
   determining an emergency braking scenario, wherein the vehicle is brought to a halt by an emergency braking system, braking the vehicle automatically without driver input;
   determining an unconscious driver condition when a position of a brake pedal or a gas pedal of the vehicle does not change for a predetermined time after the emergency braking scenario; and
   actuating the parking brake when the unconscious driver condition is met.

2. The method according to claim 1, wherein the braking of the vehicle takes place at least partially through a system of the vehicle.

3. The method according to claim 1, wherein the braking of the vehicle solely takes place through a system of the vehicle.

4. The method according to claim 1, further comprising:
   monitoring a driving device when the vehicle is determined to be brought to a halt by the emergency braking system; and
   actuating the parking brake when neither the brake pedal or the gas pedal are depressed within a predetermined time from the braking of the vehicle to a halt by the emergency braking system and when the driving device is not moved within the predetermined time from the braking of the vehicle to a halt by the emergency braking system.

5. The method according to claim 1, further comprising:
   monitoring a transmission device when the vehicle is determined to be brought to a halt by the emergency braking system; and
   actuating the parking brake when neither the brake pedal or the gas pedal are depressed within a predetermined time from the braking of the vehicle to a halt by the emergency braking system and when the transmission device is not moved within the predetermined time from the braking of the vehicle to a halt by the emergency braking system.

6. The method according to claim 1, wherein the monitoring of the gas pedal and brake pedal takes place through an on-board computer of the vehicle.

7. The method according to claim 1, wherein the actuating is performed by a validation device with at least one sensor, and wherein the method further comprises preventing the actuating of the first vehicle component after the predetermined time when the validation device detects the actuation of the second vehicle component.

8. The method according to claim 7, wherein the at least one sensor is an acoustic sensor.

9. The method according to claim 7, wherein the at least one sensor is an optical sensor.

10. The method according to claim 7, wherein the validation device comprises a fuzzy logic network.

11. The method according to claim 7, wherein the validation device comprises a neural network.

12. The method according to claim 6, further comprising transmitting warning information via a vehicle-to-vehicle communication device.

13. A device for activating a parking brake of a vehicle comprising:
   an emergency braking system designed for automatically braking the vehicle to a halt in an emergency braking scenario without driver input;
   a monitoring device determining an unconscious driver condition when a position of a brake pedal or gas pedal of the vehicle does not change for a predetermined time after the emergency braking scenario; and
   an actuation device designed for actuating the parking brake when the unconscious driver condition is met.

14. The device according to claim 13, wherein the monitoring device further monitors a driving device and the actuation device is further configured to actuate the parking brake when the monitoring device determines that neither the brake pedal or the gas pedal were depressed within a predetermined time from the emergency braking system braking the vehicle to a halt and the driving device was not moved within the predetermined time from the emergency braking system braking the vehicle to a halt.

15. The device according to claim 13, wherein the monitoring device further monitors a transmission device and the actuation device is further configured to actuate the parking brake when the monitoring device determines that neither the brake pedal or the gas pedal were depressed within a predetermined time from the emergency braking system braking the vehicle to a halt and the transmission device was not moved within the predetermined time from the emergency braking system braking the vehicle to a halt.

\* \* \* \* \*